March 3, 1959 K. D. O. VOGDT 2,876,039
APPARATUS FOR DISTRIBUTING PASTY MATERIAL
Filed June 14, 1956
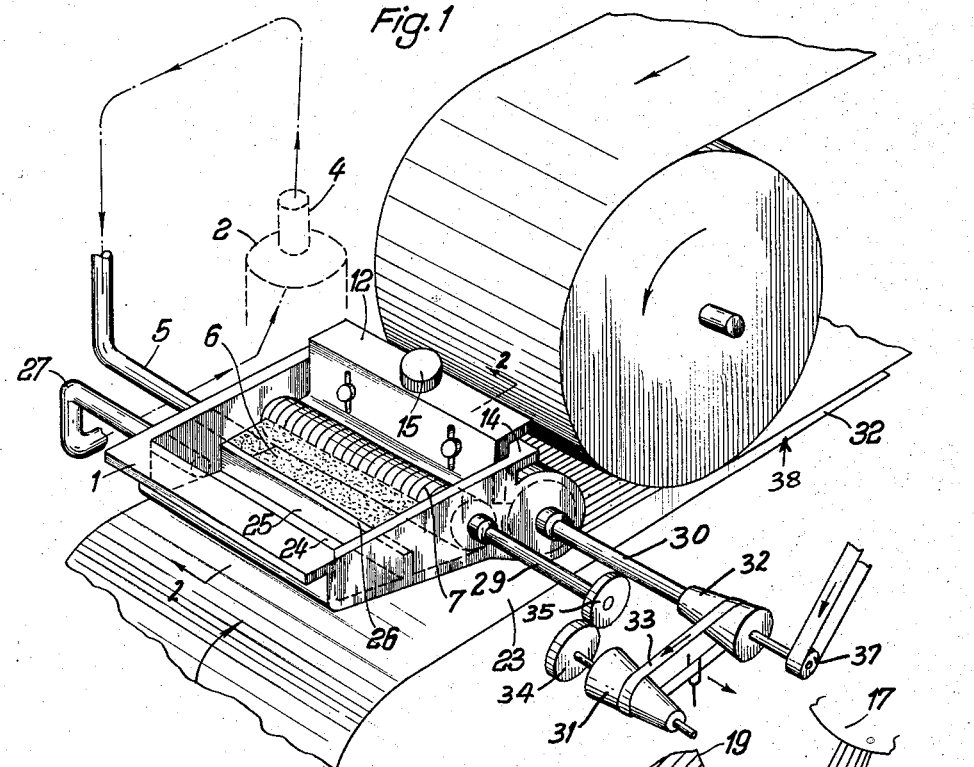
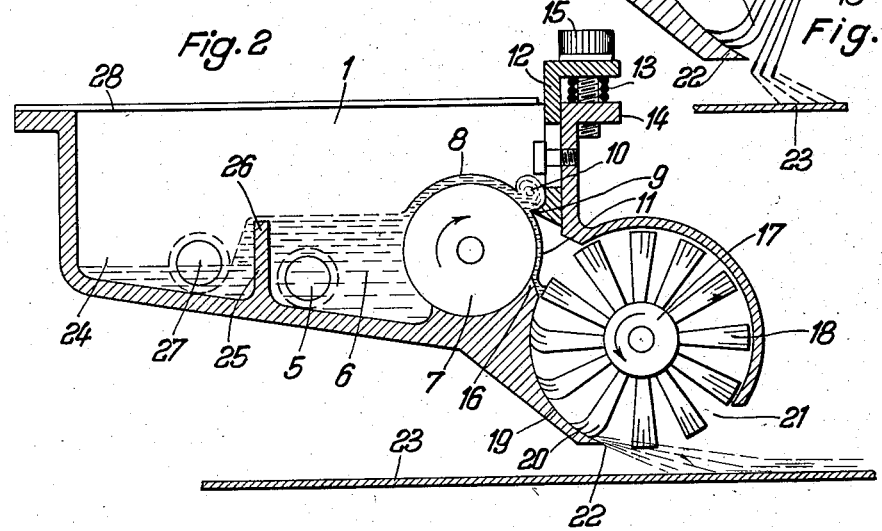
Inventor:
Kurt Dietrich Otto Vogdt

United States Patent Office 2,876,039
Patented Mar. 3, 1959

2,876,039

APPARATUS FOR DISTRIBUTING PASTY MATERIAL

Kurt Dietrich Otto Vogdt, Pinneberg, Germany, assignor to Werner Bahlsen, Hannover, Germany Application June 14, 1956, Serial No. 591,485

Claims priority, application Germany July 22, 1955

7 Claims. (Cl. 299—63)

The present invention relates to an apparatus for distributing pasty materials. Thus, the structure of the present invention may be used for distributing dough which is to be baked in a continuous manner while in continuous movement through a baking oven structure.

There are known ovens wherein the dough which is baked is carried by an endless band through the oven and it is important that the dough be applied to the band in a uniform layer to produce baked articles of desirable density and uniform color. Up to the present time all of the known devices for distributing the dough to such an oven have not satisfactorily produced a uniform layer resulting in a uniform product of desired properties.

One of the objects of the present invention is to provide a structure capable of distributing a pasty material in a uniform manner.

Another object of the present invention is to provide an apparatus for distributing a pasty material in a manner which will cause water in the pasty material to quickly vaporize therefrom.

A further object of the present invention is to provide an apparatus for distributing a pasty material uniformly and continuously to a continuously moving band or the like, for example.

An additional object of the present invention is to provide an apparatus capable of accomplishing the above objects and at the same time being composed of simple and ruggedly constructed elements which are very reliable in operation.

With the above objects in view the present invention mainly consists of an apparatus for distributing a pasty material, this apparatus including an elongated cylindrical brush having a plurality of outwardly directed bristles uniformly distributed about the axis thereof. A support means supports this brush for rotation about its axis, and an elongated bending member is carried by the support means in a position extending substantially parallel to the brush. This bending member has a concave face directed toward the axis of the brush and this concave face has a free edge portion toward which the bristles of the brush move during rotation of the brush. This free edge portion is located nearer to the axis of the brush than the outer extremities of the bristles thereof so that the bristles are bent by the bending member and suddenly return to their original shape when they move beyond the free edge portion of the bending member. A delivery roller is carried by the support means for delivering to the bending member a pasty material which is picked up by the bristles of the brush, and the delivery roller as well as the brush are connected to a common drive means which may be adjustable. A supply means supplies the pasty material to the roller. Thus, the rotating brush which picks up the pasty material throws the latter from its bristles by the centrifugal force of the rotating brush, and the pasty material is furthermore thrown from the bristles of the brush by the sudden snapping of these bristles back to their original shape after they leave the above mentioned free edge portion of the bending member. Thus, a member located in the path of the thrown pasty material will have the latter deposited thereon.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic perspective view of an apparatus according to the present invention;

Fig. 2 is a sectional elevational view on an enlarged scale taken along line 2—2 of Fig. 1 in the direction of the arrows and showing the important elements of the structure of the invention; and Fig. 3 is a sectional elevational view on an enlarged scale illustrating the snapping action of the brush bristles after they leave the bending member.

Referring now to the drawings and to Fig. 1 in particular, it will be seen that a pair of endless bands are fragmentarily illustrated in Fig. 1. The lower band 23 as well as the upper endless band may be made of steel, and these bands form between themselves a baking gap 38. The details of the oven structure are of no pertinence to the present invention, and for this reason the endless bands are only illustrated fragmentarily and many of the details associated therewith are omitted.

The structure of the present invention includes a support means in the form of a housing 1 made of a rigid metal or the like. This housing 1 is open at its top portion, and the upper opening of the housing 1 may be covered by any suitable cover plate 28 or the like.

As is schematically illustrated in Fig. 1, a container 2 contains the pasty material which is to be distributed, and this container 2 has the pasty material withdrawn therefrom by a pump 4 schematically illustrated in Fig. 1. The pump 4 forces the pasty material to move from the container 2 along a conduit 5 which communicates with a chamber 6 forming part of a reservoir in the interior of the housing 1. The housing 1, which forms the support means for the structure of the invention, carries a delivery roller 7 for rotation about its axis, and the pasty material is delivered to the chamber 6 which communicates with the roller 7 so that as the latter rotates in a clockwise direction, as viewed in Fig. 2, the pasty material which has the property of clinging to the outer face of the roller 7 is picked up by the latter in the form of a layer 8 which moves with the roller in a clockwise direction, as viewed in Fig. 2.

In order to maintain a uniform thickness of the layer of pasty material on the roller 7, an elongated cutting member 9 is carried by the support means in a position parallel to the roller 7 and spaced slightly from the outer face thereof so that the elongated cutting member 9 cuts from the layer 8 part of the pasty material 10 to leave on the roller 7 a layer 11 of uniform thickness. The cutting member 9 is carried by the lower portion of an angle member 12, and this cutting member 9 may be integral with the member 12, as indicated in Fig. 2. This angle member 12 has a pair of elongated slots formed therein, and screw members extend through these slots into threaded engagement with the upper portion of the right wall of the housing 1, as viewed in Fig. 2, so that in this way the angle member 12 is guided for vertical movement so as to carry the cutting member 9 vertically with the same. A knurled screw member 15 extends through an opening in the upper wall of the angle member 12 into threaded engagement with a flange 14 of the housing 1, and a coil spring 13 is located between the upper face of the flange 14 and the underside of the top wall of the angle member 12 to urge the latter upwardly against the head of the knurled screw 15. Thus, the operator may turn the screw 15 so as to regulate the elevation of the cutting member 9, and in this way the thickness of the layer 11 may be controlled in accordance with the particular properties of the pasty material being handled by the apparatus at any given time.

A guide member 16 formed integrally with the bottom wall of the housing 1 cooperates with the outer face of the rotating delivery roller 7 for removing the layer 11 of pasty material therefrom and guiding this layer of pasty material downwardly, as viewed in Fig. 2.

In accordance with the present invention an elongated cylindrical brush 17 having outwardly directed bristles 18 uniformly distributed about its axis is carried for rotation by the support means 1. The brush 17 has a length substantially equal to that of the roller 7 and is substantially coextensive with the latter. As is evident from Fig. 2, the brush 17 rotates in a counterclockwise direction.

The support means 1 also carries a bending member 19 which forms an integral part of the lower wall of the housing 1 and forms part of the chamber in which the brush 17 rotates. This bending member 19 has a concave face directed toward the brush 17, and the bending member 19 extends substantially parallel to the brush 17 and is coextensive with the latter. At its bottom end the bending member 19 includes a free edge portion 22 which is located nearer to the axis of the brush 17 than the outer extremities of the bristles 18 thereof. Thus, as the bristles 18 approach the edge 22 of bending member 19 during rotation of the brush the free end portions of the bristles 18 are bent as indicated at 20 in Fig. 2, and when the bent bristles move beyond the edge 22 they suddenly snap back to their original shape.

The pasty material delivered to the upper edge of the bending member 19 by the guide member 16 is picked up by the bristles 18 which are then bent and when these bristles move beyond the edge 22 the pasty material is thrown from the bristles first as a result of the centrifugal force of the rotating brush and second as a result of the snapping of the bristles back to their original shape. As is evident from Fig. 2 the housing 1 is formed with a cutout 21 along which the bristles 18 move after they pass beyond the edge 22, so that the pasty material is in this way thrown from the bristles beyond the housing 1 downwardly and to the right, as viewed in Fig. 2, and since the band 23 is located in the path of movement of the thrown pasty material the latter is deposited on the band 23.

It is preferred to space the axis of the concave face of bending member 19 from the axis of the brush 17 in such a way that the concave face of the bending member 19 becomes gradually located at a greater distance from the axis of brush 17 as this concave face curves from its bottom edge 22 to its top edge. At the top edge it is preferred to locate the bending member at a distance from the axis of the brush 17 at least as great as the distance of the outer extremities of the bristles 18 from the axis of the brush, so that with this arrangement the bristles when they first engage the upper edge of the bending member 19 are not bent by the latter and become gradually bent to an increasing degree as they approach the edge 22.

The snapping action of the bristles 18 is shown particularly clearly in Fig. 3 which clearly indicates how the separate bristles snap back to their original shape as they move beyond the edge 22 so as to throw the pasty material from these bristles onto the member 23.

As was mentioned above the pasty material is delivered from the conduit 5 to the chamber 6 which forms part of a reservoir carried by and forming part of the support means 1. This reservoir includes an upwardly directed partition 25 having a free top edge 26, and this partition divides the reservoir into a chamber 24 and the chamber 6. It will be noted from Fig. 2 that the upper edge 26 of the partition 25 is located below the uppermost part of the delivery roller 7. The pump 4 as well as the container 2 are so designed that the pasty material will be delivered to the chamber 6 at a rate greater than that of which the pasty material is withdrawn from the chamber 6 by the rotating roller 7. This will create an excess of pasty material which will flow over the upper edge 26 of the partition 25 into the chamber 24. A conduit communicates with the chamber 24 to carry the pasty material from the same and deliver the pasty material back to the container 2. In this way a constant level of the pasty material within the chamber 6 is maintained, so that the structure of the invention operates independently of the container 2 and the motor 4.

The pasty material will have different properties depending upon the articles which are desired, and for this reason the relative speeds of rotation of the roller 7 and brush 17 is adjustable. The roller 7 is fixed to a drive shaft 29 which carries a gear 35, as shown in Fig. 1. The brush 17 is fixed to a drive shaft 30. The gear 35 meshes with a gear 34 which is connected to an elongated frustoconical member 31 for rotation with the latter, and an elongated frustoconical member 32 is fixed to the shaft 30 for rotation therewith. The frustoconical members 31 and 32 are directed oppositely to each other while having their axes parallel to each other, as indicated in Fig. 1. A belt 33 passes about and engages the frustoconical members 32 and this belt 33 may be shifted by shifting fork diagrammatically indicated in Fig. 1 along the frustoconical members 31 and 32 so as to regulate in this way the relative speeds of rotation of the delivery roller 7 and the brush 17. A belt rotated by any suitable motor or the like engages a pulley 37 fixed to the shaft 34 rotating the latter, and in this way a common drive is connected to the roller 7 and brush 17 and the relative speeds of rotation of elements 7 and 17 may be adjusted.

The cover 28 is not shown in Fig. 1 so that the structure within the housing 1 appears clearly in Fig. 1.

A particular advantage derived from the structure of the invention is that due to the centrifugal throwing of the pasty material onto the band 23, the moisture within the pasty material easily vaporizes therefrom before the pasty material reaches the baking gap 38, and as a result the baked products have a lesser density than would be the case if the moisture therein were not easily vaporized therefrom. Furthermore, with the structure of the invention the baked articles have a uniform color.

Because of the adjustable features of the apapratus of the invention it is possible for this apparatus to operate very efficiently with pasty materials of widely different properties.

It will be understood that each of the elements described above, or two or more together, may also find a useful application in other types of apparatus for distributing pasty materials differing from the types described above.

While the invention has been illustrated and described as embodied in apparatus for distributing a uniform layer of dough to a member which carries the dough into an oven, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for distributing a pasty material, comprising, in combination, an elongated substantially cylindrical brush having outwardly directed bristles distributed substantially uniformly about the axis of said brush; support means supporting said brush for rotation about its axis; an elongated bending member carried by said support means in a position extending substantially parallel to the axis of said brush and having a concave face directed toward said brush and provided with an edge portion toward which the free ends of the bristles move during rotation of the brush, said edge portions being located nearer to the axis of the brush than the outer extremities of the bristles thereof so that the latter are bent by said bending member and suddenly return to their original shape upon moving beyond said edge of said bending member; a delivery roller having an axis substantially parallel to the brush axis carried for rotation about its axis by said support means and located adjacent to a portion of said bending member spaced from said edge thereof for delivering a pasty material to said bending member to be picked up by the bristles of the brush as said bristles move along said bending member toward said edge thereof; supply means communicating with the outer face of said delivery roller for supplying the pasty material thereto to be delivered therefrom to said bending member; and drive means operatively connected to said delivery roller and said brush for simultaneously rotating said roller and brush, whereby the pasty material on the bristles of the brush will be thrown therefrom by the centrifugal force of the rotating brush and by the snapping action of the brush bristles when they move beyond said edge of said bending member, whereby a member located in the path of the thrown pasty material will have the latter deposited thereon.

2. Apparatus for distributing a pasty material, comprising, in combination, an elongated substantially cylindrical brush having outwardly directed bristles distributed substantially uniformly about the axis of said brush; support means supporting said brush for rotation about its axis; an elongated bending member carried by said support means in a position extending substantially parallel to the axis of said brush and having a concave face directed toward said brush and provided with an edge portion toward which the free ends of the bristles move during rotation of the brush, said edge portions being located nearer to the axis of the brush than the outer extremities of the bristles thereof so that the latter are bent by said bending member and suddenly return to their original shape upon moving beyond said edge of said bending member; a delivery roller having an axis substantially parallel to the brush axis carried for rotation about its axis by said support means and located adjacent to a portion of said bending member spaced from said edge thereof for delivering a pasty material to said bending member to be picked up by the bristles of the brush as said bristles move along said bending member toward said edge thereof; supply means communicating with the outer face of said delivery roller for supplying the pasty material thereto to be delivered therefrom to said bending member; drive means operatively connected to said delivery roller and said brush for simultaneously rotating said roller and brush, whereby the pasty material on the bristles of the brush will be thrown therefrom by the centrifugal force of the rotating brush and by the snapping action of the brush bristles when they move beyond said edge of said bending member, whereby a member located in the path of the thrown pasty material will have the latter deposited thereon; and an elongated cutting member parallel to the axis of said delivery roller and carried by said support means in a position spaced from but close to the outer face of said delivery roller for cutting away excess pasty material from the outer face of the delivery roller so as to maintain on the latter a uniform thickness of pasty material delivered by the roller to said bending member.

3. Apparatus for distributing a pasty material, comprising, in combination, an elongated substantially cylindrical brush having outwardly directed bristles distributed substantially uniformly about the axis of said brush; support means supporting said brush for rotation about its axis; an elongated bending member carried by said support means in a position extending substantially parallel to the axis of said brush and having a concave face directed toward said brush and provided with an edge portion toward which the free ends of the bristles move during rotation of the brush, said edge portions being located nearer to the axis of the brush than the outer extremities of the bristles thereof so that the latter are bent by said bending member and suddenly return to their original shape upon moving beyond said edge of said bending member; a delivery roller having an axis substantially parallel to the brush axis carried for rotation about its axis by said support means and located adjacent to a portion of said bending member spaced from said edge thereof for delivering a pasty material to said bending member to be picked up by the bristles of the brush as said bristles move along said bending member toward said edge thereof; supply means communicating with the outer face of said delivery roller for supplying the pasty material thereto to be delivered therefrom to said bending member; drive means operatively connected to said delivery roller and said brush for simultaneously rotating said roller and brush, whereby the pasty material on the bristles of the brush will be thrown therefrom by the centrifugal force of the rotating brush and by the snapping action of the brush bristles when they move beyond said edge of said bending member, whereby a member located in the path of the thrown pasty material will have the latter deposited thereon; an elongated cutting member parallel to the axis of said delivery roller and carried by said support means in a position spaced from but close to the outer face of said delivery roller for cutting away excess pasty material from the outer face of the delivery roller so as to maintain on the latter a uniform thickness of pasty material delivered by the roller to said bending member; and adjusting means operatively connected to said cutting member for adjusting the distance between the latter and the outer face of said delivery roller.

4. Apparatus for distributing a pasty material, comprising, in combination, an elongated substantially cylindrical brush having outwardly directed bristles distributed substantially uniformly about the axis of said brush; support means supporting said brush for rotation about its axis; an elongated bending member carried by said support means in a position extending substantially parallel to the axis of said brush and having a concave face directed toward said brush and provided with an edge portion toward which the free ends of the bristles move during rotation of the brush, said edge portion being located nearer to the axis of the brush than the outer extremities of the bristles thereof so that the latter are bent by said bending member and suddenly return to their original shape upon moving beyond said edge of said bending member; a delivery roller having an axis substantially parallel to the brush axis carried for rotation about its axis by said support means and located adjacent to a portion of said bending member spaced from said edge thereof for delivering a pasty material to said bending member to be picked up by the bristles of the brush as said bristles move along said bending member toward said edge thereof; supply means communicating with the outer face of said delivery roller for supplying the pasty material thereto to be delivered therefrom to said bending member; drive means operatively connected to said delivery roller and said brush for simultaneously rotating said roller and brush, whereby the pasty material on the bristles of the brush will be thrown therefrom by the centrifugal force of the rotating brush and by the snapping action of the brush bristles when they move beyond said edge of said bending member, whereby a member located in the path of the thrown pasty material will have the latter deposited thereon; and adjusting means operatively connected to said drive means for adjusting the relative speeds of rotation of said delivery roller and brush with respect to each other.

5. Apparatus for distributing a pasty material, comprising, in combination, an elongated cylindrical brush having a plurality of outwardly directed bristles substantially uniformly distributed about the axis thereof; support means supporting said brush for rotation about its axis; an elongated bending member carried by said support means in a position extending substantially parallel to the axis of said brush, said bending member having a concave face directed toward said brush and having a free edge portion toward which the bristles of the brush move during rotation of the latter, said edge portion being located nearer to the axis of said brush than the outer extremities of said bristles so that the latter are bent by said bending member and suddenly snap back to their original shape upon movement beyond said edge of said bending member; an elongated delivery roller substantially coextensive with said bending member and brush and having an axis parallel to that of said brush, said delivery roller being carried by said support means for rotation about its axis in a position adjacent said bending member so that a pasty material on the outer surface of said delivery roller will move therefrom to said bending member to be picked up from the latter by the bristles of the brush; a guide member carried by said support means and extending between said delivery roller and bending member for removing the pasty material from the rotating delivery roller and guiding the same to said bending member; a reservoir for the pasty material communicating with said delivery roller for applying pasty material to the latter; and supply means communicating with said reservoir for supplying pasty material to the latter.

6. Apparatus for distributing a pasty material, comprising, in combination, an elongated cylindrical brush having a plurality of outwardly directed bristles substantially uniformly distributed about the axis thereof; support means supporting said brush for rotation about its axis; an elongated bending member carried by said support means in a position extending substantially parallel to the axis of said brush, said bending member having a concave face directed toward said brush and having a free edge portion toward which the bristles of the brush move during rotation of the latter, said edge portion being located nearer to the axis of said brush than the outer extremities of said bristles so that the latter are bent by said bending member and suddenly snap back to their original shape upon movement beyond said edge of said bending member; an elongated delivery roller substantially coextensive with said bending member and brush and having an axis parallel to that of said brush, said delivery roller being carried by said support means for rotation about its axis in a position adjacent said bending member so that a pasty material on the outer surface of said delivery roller will move therefrom to said bending member to be picked up from the latter by the bristles of the brush; a guide member carried by said support means and extending between said delivery roller and bending member for removing the pasty material from the rotating delivery roller and guiding the same to said bending member; a reservoir for the pasty material communicatnig with said delivery roller for applying pasty material to the latter; supply means communicating with said reservoir for supplying the latter with a pasty material at a rate greater than the rate at which the pasty material is withdrawn from the reservoir by said delivery roller; level control means communicating with said reservoir for maintaining the pasty material therein at a constant level; and drive means operatively connected to said delivery roller and brush for simultaneously rotaing said roller and brush.

7. Apparatus for distributing a pasty material comprising, in combination, an elongated cylindrical brush having a plurality of outwardly directed bristles substantially uniformly distributed about the axis thereof; support means supporting said brush for rotation about its axis; an elongated bending member carried by said support means in a position substantially parallel to the axis of said brush and having a portion located nearer to the axis of said brush than the outer extremities of the bristles thereof to bend said bristles so that when the latter move beyond said bending member the bristles suddenly resume their original shape; roller means carried by said support means for rotation about an axis substantially parallel to that of the brush and located adjacent said bending member for delivering to the latter a pasty material to be picked up by the bristles of said brush; a reservoir carried by said support means and communicating with said roller for supplying a pasty material to the latter; a partition carried by said support means and dividing said reservoir into a pair of separate chambers, said partition having a free upper edge located at a lower elevation than the uppermost portion of said roller; supply means communicating with the chamber located between said partition and roller for supplying to the latter chamber pasty material at a rate greater than that at which the roller picks up the pasty material and delivers the same to the bristles of the brush, whereby the excess pasty material will flow over the upper edge of said partition into the second chamber, so that said partition acts to maintain in the chamber communicating with said roller a uniform level of pasty material.

References Cited in the file of this patent

UNITED STATES PATENTS

| | | |
|---|---|---|
| 629,513 | Liebscher | July 25, 1899 |
| 1,588,062 | Spiney | June 8, 1926 |
| 1,686,968 | Harber | Oct. 9, 1928 |
| 1,729,712 | Daignas | Oct. 1, 1929 |
| 2,613,633 | Dreesen | Oct. 14, 1952 |